United States Patent [19]
Belka et al.

[11] Patent Number: 6,142,375
[45] Date of Patent: Nov. 7, 2000

[54] APPARATUS AND METHOD FOR THE OPTICAL DETECTION OF MULTIPLE ITEMS ON A PLATFORM

[75] Inventors: Anthony M. Belka, Stillwater; Thomas J. Brace, Woodbury; Ronald D. Jesme, Plymouth; John E. Nelson; Samuel H. Tao, both of Woodbury; Peter J. Zarembo, Shoreview, all of Minn.

[73] Assignee: 3M Innovative Properties Company, St. Paul, Minn.

[21] Appl. No.: 09/058,585

[22] Filed: Apr. 10, 1998

[51] Int. Cl.[7] .......................................................... G06K 7/10
[52] U.S. Cl. ............................................. 235/454; 382/140
[58] Field of Search ........................ 235/462.24, 462.18, 235/440, 375, 383, 384, 385, 98 C, 454; 377/6–9, 17, 19; 382/141, 140; 250/222.1–222.2, 559.38, 559.07, 559.08, 559.22, 223 R; 356/376, 375

[56] References Cited

U.S. PATENT DOCUMENTS

| | | |
|---|---|---|
| Re. 27,869 | 1/1974 | Willits et al. . |
| 3,747,086 | 7/1973 | Peterson . |
| 4,141,078 | 2/1979 | Bridges, Jr. et al. . |
| 4,384,195 | 5/1983 | Nosler . |
| 4,650,991 | 3/1987 | Croset et al. . |
| 4,788,441 | 11/1988 | Laskowski . |
| 4,881,061 | 11/1989 | Chambers . |
| 4,962,538 | 10/1990 | Eppler et al. . |
| 5,235,167 | 8/1993 | Dvorkis et al. ..................... 235/462.21 |
| 5,288,980 | 2/1994 | Patel et al. . |
| 5,414,251 | 5/1995 | Durbin ................................ 235/462.2 |
| 5,477,371 | 12/1995 | Shafir . |
| 5,500,640 | 3/1996 | Zhou et al. . |
| 5,672,881 | 9/1997 | Striepeke et al. . |
| 5,691,528 | 11/1997 | Wyatt et al. ........................ 235/462.07 |
| 5,701,181 | 12/1997 | Bojarski et al. . |
| 5,783,811 | 7/1998 | Feng et al. ......................... 235/462.42 |

FOREIGN PATENT DOCUMENTS

| | | |
|---|---|---|
| 196 23 524 A1 | 1/1998 | Germany . |

*Primary Examiner*—Thien M. Le
*Assistant Examiner*—Diane I. Lee
*Attorney, Agent, or Firm*—Peter L. Olson

[57] ABSTRACT

An apparatus for detecting the presence of multiple items includes a platform upon which one or more items may be placed and a detector positioned with respect to the platform to receive an image of a profile of the one or more items on the platform. The detector is configured and arranged to generate a signal corresponding to the profile. The signal indicates whether multiple items are on the platform. The detector may be, for example, a moving point detector, a linear detector, or a two-dimensional array detector. This apparatus can be used in conjunction with an inventory control device, such as an automated library check-out device, to prevent the unauthorized removal of inventory items.

22 Claims, 14 Drawing Sheets

APPARATUS AND METHOD FOR THE OPTICAL DETECTION OF MULTIPLE ITEMS ON A PLATFORM

TECHNICAL FIELD

The present invention is directed to an apparatus and method for determining the presence of multiple items on a platform. More particularly, the present invention relates to an automatic inventory control device and method for the optical determination of the presence of multiple inventory items on a platform.

BACKGROUND OF THE INVENTION

Automatic inventory control systems often expedite the removal of items from an inventory. Libraries are one example of facilities in which automatic inventory control systems are used. Many libraries use an identification tag, such as a bar coded label, to identify some or all of their materials. By scanning the tag, the identity of the item can be retrieved from a database. When another tag on a patron's library card is scanned, the library item may be checked out to the patron.

Often, this check-out operation is performed by library personnel. However, many libraries are installing automated systems that allow patrons to check out books and other library materials by themselves. One example of an automated system begins with the patron presenting his library card to an automated check-out device which reads the identification tag on the card. Each item from the library is then sequentially placed on the device, the device reads the item's identification tag, and the item is recorded by the system as having been checked out to the patron.

There are also systems that prevent the unauthorized removal of items from the library. One example of such a system uses inventory control markers, such as magnetic strips, which can be activated and deactivated (e.g., demagnetized and remagnetized). An inventory control marker is provided in each book or other library item and a sensor is placed at the entrance and/or exit of the facility. To perform the inventory control function, each inventory control marker is activated prior to returning a library book or other item to the shelf. When the library item is checked out, the inventory control marker is deactivated. The patron may then walk past the sensor without actuating the alarm. However, if the patron attempts to walk past the sensor without checking the library item out, either purposefully or accidentally, then the alarm sounds and/or the patron is stopped by, for example, a gate. Presently, library personnel who check books out for patrons deactivate the inventory control marker manually.

Most conventional automated check-out devices also deactivate the inventory control marker in a library item which is checked-out. For a magnetic inventory control marker, this is typically accomplished by bringing a library item, having a magnetic strip (the inventory control marker) attached to it (typically near the spine of a book), near an electro magnet that generates a direct current (DC) field. However, if two or more books or other library items are placed on top of or next to each other in the automated check-out device, only one of the identification tags is read, but both inventory control markers may be deactivated. This would allow the patron to remove two or more library items while actually checking out only one. Thus, it is desirable to have a mechanism for determining whether there are multiple items on or in the check-out device.

One method currently used for determining the presence of two or more library items is to scan for the number of inventory control markers. For magnetic inventory control markers, this procedure typically includes using a constant magnetic field. This may be undesirable in certain situations, especially if other electronic devices are nearby, because interference may occur, resulting in improper functioning of these devices. Furthermore, there are often limits on the resolution of such systems which may make individual inventory control markers on items, such as thin books, cassette tapes, or CDs, difficult to individually resolve, so that the sensor may detect only a single marker. Furthermore, some library materials may not have inventory control markers. Thus, a need exists for a new and improved method of determining the number of inventory items in or on an inventory control device.

SUMMARY OF THE INVENTION

The present invention relates to a device and method for optically determining whether multiple items are placed on an inventory control device. One embodiment is an apparatus for detecting the presence of multiple items which includes a platform upon which one or more items may be placed, and a detector positioned to receive an image of a profile of items on the platform. The detector is arranged to generate a signal corresponding to the profile, and the signal, when evaluated, indicates whether multiple items are on the platform.

Another embodiment is an inventory control apparatus having a housing with a platform upon which items may be placed. A light source is coupled to the housing for illuminating items on the platform with light. The light source directs the light along a profile of items on the platform. The apparatus also includes a two-dimensional detector coupled to the housing and positioned to receive light from the light source that is redirected by items on the platform. The detector is arranged to generate a signal corresponding to the profile of the items. An optional processor is coupled to the detector for evaluating the signal from the detector to determine the number of items on the platform. The inventory control apparatus also may include a scanner coupled to the housing and positioned to read an item identification number provided on an item that is placed on the platform, and an inventory control deactivation device positioned to deactivate an inventory control marker on the inventory item when the processor indicates the presence of only one inventory item on the platform, and the scanner has read and verified the existence of the item identification number on the inventory item.

The present invention is further directed to a method for determining the presence of multiple items on a platform. A detector receives light that has been redirected by the items on the platform. A signal is generated corresponding to a profile of the items on the platform. The signal is evaluated to determine the number of items on the platform.

A further embodiment is a method of inventory control. Items on the platform are illuminated with light. At least a portion of the light is redirected from a profile of the items on the platform toward a two-dimensional detector. The detector generates a detector signal corresponding to the profile. The detector signal is evaluated to determine whether multiple inventory items are on the platform.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 12A and 12B through 17A and 17B are graphical representations of preprocessed (Figures with "A" postscripts) and post-processed (Figures with "B" postscripts) signals received from the device of FIG. 6.

DESCRIPTION OF THE ILLUSTRATED EMBODIMENTS

The present invention is applicable to an apparatus and a method for determining whether multiple items are placed on an inventory control device. In particular, the present invention is directed to an apparatus and a method which use optical techniques for the detection of multiple items placed on an inventory control device. While the present invention is not so limited, an appreciation of various aspects of the invention will be gained through a discussion of an inventory control device used as an automated check-out device in a library as described below and illustrated in the figures. It will be appreciated that similar devices may be used in other inventory control situations, such as in retail and grocery stores, in a factory, on a manufacturing line, or for shipment of packages.

Figure 1:
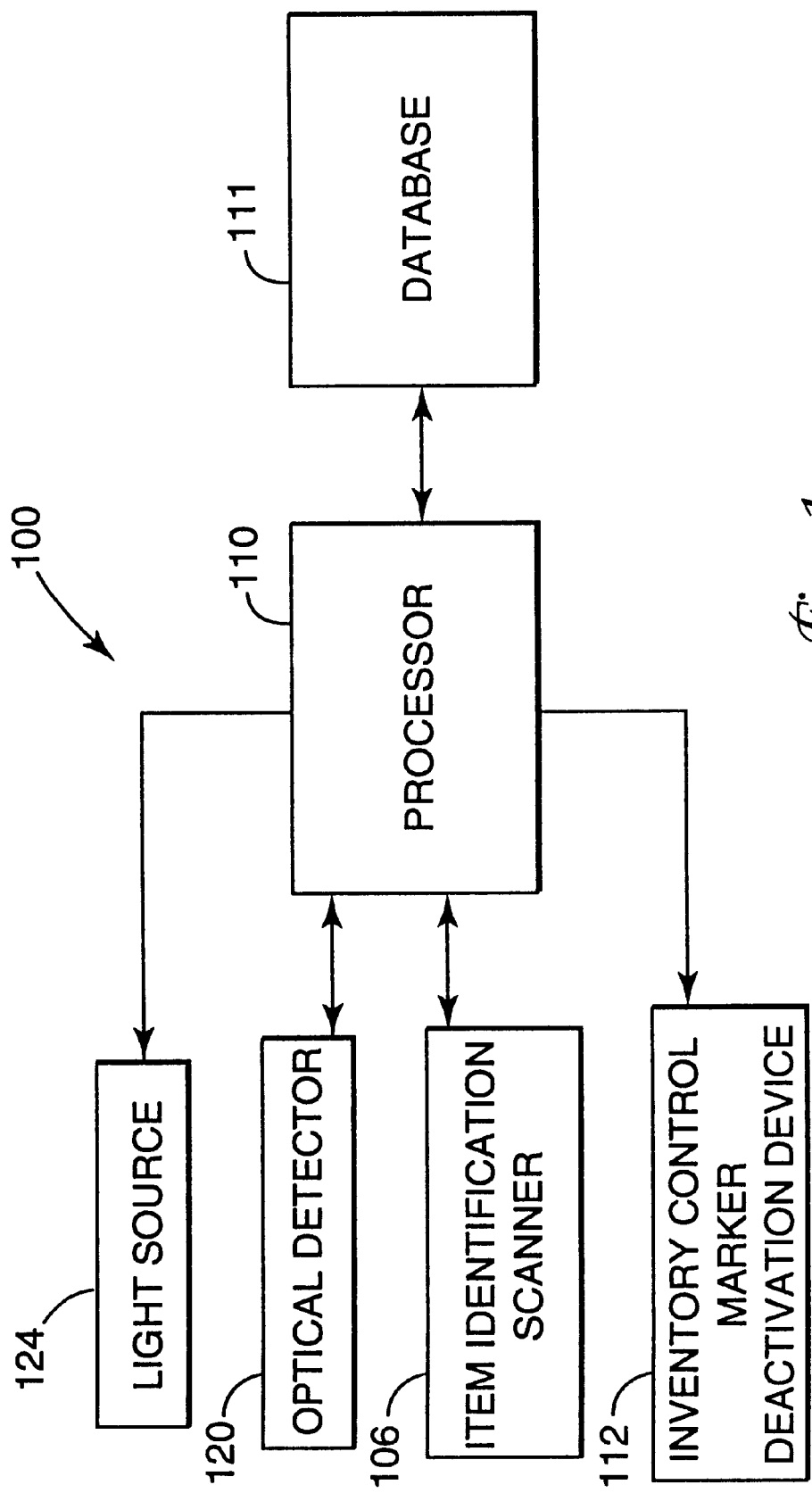
FIG. 1 is a block diagram describing the functions of one embodiment of an inventory control device according to the invention.

A block diagram of an exemplary inventory control device 100 is illustrated in FIG. 1. The inventory control device 100 typically includes an optical detector 120 which receives light that has bounced off or otherwise been redirected by inventory items on/in the inventory control device 100. The signal from the optical detector 120 may then be used to determine whether multiple items are present. The optical detector 120 is coupled to a processor 110 that receives a signal from the optical detector 120 and analyzes the signal to determine whether multiple items are present. In some embodiments, the processor 110 may also activate the optical detector 120, for example, when a valid user is present or when items are placed in the inventory control device 100. In other embodiments, the optical detector 120 may be continuously or periodically active so that the detector 120 can determine when an item is placed in the inventory control device 100. The optical detector then activates the device to begin a check-out process.

The inventory control device 100 may include one or more optional items including a light source 124, an item identification scanner 106, and/or an inventory control marker deactivation apparatus 112. Other optional items that are not shown in FIG. 1 include a display for providing information and instructions to the user, an input device (such as a keypad, keyboard, or on-screen menu system) to allow user input, and a warning device which may be activated to inform library personnel of problems in the check-out procedure.

The light source 124 may be used to illuminate items in the inventory control device 100, although, in some embodiments, ambient light may be used. The processor 110 may be coupled to the light source to activate the light source, for example, when a valid user is present or when items are placed in the inventory control device 100. Alternatively, the light source is activated whenever the inventory-control device 100 is turned on.

The optional item identification scanner 106 may be used to read an identification tag on an item to determine which item is being checked out. The item identification scanner 106 may then transfer that information to the processor 110 which consults a database 111 to determine the identity of the item and/or to update the status of the item in the database ("checked-out" or "checked-in," for example). The item identification scanner 106 may also receive a signal from the processor 110 to activate the scanner 106 when, for example, an item is placed in the inventory control device 100. The item identification scanner 106 or another scanner (not shown) may be used to read a patron's identification tag on, for example, a library card. This information may also be provided to the processor 110 and used to determine the status of the user from the database 111.

The optional inventory control marker deactivation apparatus 112 may be used to deactivate the inventory control marker on an item once it is determined that there is only one item on the inventory control device 100. The inventory control marker deactivation apparatus 112 is coupled to the processor 110 that determines whether there are multiple items. The processor 110 may also be configured to require that the user have a valid user identification number prior to deactivating the inventory control marker.

The processor 110 may be a single processing unit or may contain multiple processing units, each processing unit having one or more functions. Typically, some or all of the processing units are coupled together, particularly those with complementary functions. The processor 110 may be provided in a housing of the inventory control device 100 or the processor may be remote to the inventory control device 100, such as an external computer with appropriate input and output connections to the inventory control device 100 and appropriate software for operating the device. The functions performed by the processor 110 may be implemented using hardware, firmware, software, or a combination thereof.

The database 111 may be a single database or multiple databases. The database 111 may be part of the processor 110 or may be remote to the processor, such as, for example, a central library computer.

Figure 2:
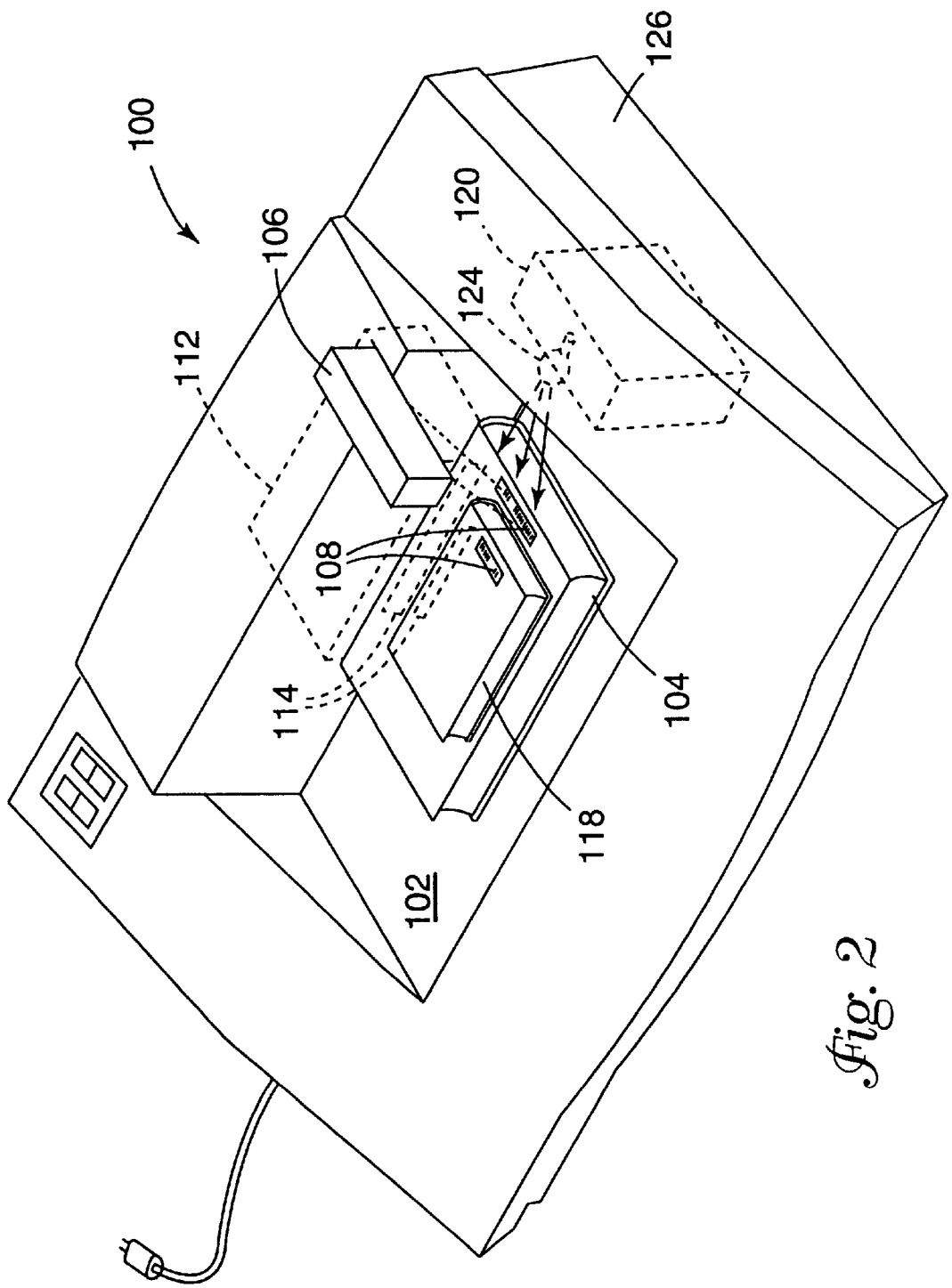
FIG. 2 is a perspective view of one embodiment of an inventory control device according to the invention.

One embodiment of an inventory control device 100 has a platform 102 upon which inventory items 104 may be placed, as shown in FIG. 2. The inventory control device 100 may optionally include a display unit (not shown) for providing information to a user. If the inventory control device 100 is used in a library, such information may include directions for using the device 100, a list of inventory items 104 which are being checked-out, a reminder about overdue items, and/or a warning and directions if the check-out procedure is suspended or terminated, as described below. In the case of a library, inventory items 104 could include, for example, books, magazines, tapes, CDs, videotapes, and computer software. These items can generically be referred to as "books," although it will be understood that any other items may be substituted, unless otherwise indicated.

The inventory control device 100 also includes an item identification scanner 106 for reading an identification tag 108 on the inventory item 104. The information on the identification tag 108 is typically provided to a processor that consults a database of inventory items to update the status of the particular inventory item 104 being checked out. If the identification tag 108 is not found in the database, the inventory control device 100 may, for example, not allow the inventory item 104 to be checked-out and/or prompt the patron to go to library personnel to resolve the problem.

The item identification scanner 106 may also be used to read a patron identification number on, for example, a library card (not shown). Alternatively, a separate patron identification scanner (not shown) may be used. The patron identification number may be cross-referenced with a database to determine the status of the patron. If the database indicates the presence of a problem, such as overdue books or an inactive card assigned to the patron, the patron may be prompted to go to library personnel to resolve the problem. If the patron identification number is valid, then one or both of the databases may be updated when an inventory item 104 is checked out to the patron.

The inventory control device 100 may also have an inventory control marker deactivation apparatus 112 which deactivates an inventory control marker 114 on an inventory item 104 that has been placed in or on the inventory control device 100. The use of an inventory control marker deactivation apparatus is generally known in the art. The deactivation of the inventory control marker 114 typically occurs once the item 104 has been successfully checked-out. A variety of different inventory control markers 114 can be used. For example, in libraries, bookstores, and music stores, a common inventory control marker is a magnetic strip that is placed in or on a book, cassette tape, or CD (e.g., in the spine of a book or on a CD or cassette case). One example of an inventory control marker is available from Minnesota Mining and Manufacturing of St. Paul, Minn. (3M) under the designation DSB-2, sold under the name TATTLETAPE™. This marker is described in U.S. Pat. No. 3,747,086, which is incorporated herein by reference. The magnetic inventory control marker can be activated and/or deactivated by placing an appropriate magnet or series of magnets near the marker 114, or by moving the marker and/or the magnet(s) relative to each other. In practice, the magnetic inventory control marker 114 is typically activated when a book is returned to the library. As a patron checks-out the book, the inventory control marker 114 is deactivated so that the patron may exit the library without setting off an alarm or sending a warning to library personnel.

Other types of inventory control markers 114 are used including, for example, a dye tag. This type of inventory control marker is often used in clothing stores where the removal of the dye tag by an unauthorized person results in the release of dye over the clothing. The inventory control marker is typically removed by a sales person who has an appropriate inventory control marker deactivation apparatus. It will be appreciated that other types of inventory control markers, as well as other methods for removing, detecting, activating, and/or deactivating the inventory control markers 114, may be used. It will also be appreciated that an inventory control marker deactivation apparatus 112 is not necessary in all inventory control devices 100.

An inventory control marker deactivation apparatus 112 that may be used in an inventory control device 100 for a library is described in U.S. patent application Ser. No. 09/058,636, entitled "Method And Apparatus For Activating and Deactivating Electromagnetic Article Surveillance Markers," filed on even date herewith, and incorporated herein by reference. This inventory control marker deactivation apparatus 112 includes one or more permanent magnets. When an item 104 is checked out, the one or more magnets are brought into proximity with a magnetic inventory control marker 114 placed in or on the item. Often the magnetic inventory control marker 114 is placed adjacent the spine of a book or other similar item to prevent its accidental or purposeful removal. The one or more magnets on the inventory control marker deactivation apparatus 112 sweep from one side of the inventory control device 100 to the other side to deactivate the magnetic inventory control marker 114 when the item 104 has been successfully checked out. In another embodiment, the inventory control marker deactivation apparatus 112 includes an array of magnets which are moved past the magnetic inventory control marker 114 once an inventory item 104 has been successfully checked-out. In another embodiment, the inventory control marker deactivation apparatus 112 includes a coil of wire forming an electromagnet, suitably configured to develop a magnetic field which will deactivate the magnetic inventory control marker 114 once an inventory item 104 has been successfully checked out.

The inventory control marker deactivation apparatus 114 may be directed and controlled by an internal or external processor 110, as described above, that receives information read by the item identification scanner 106. When the processor determines that an authorized patron has placed an inventory item 104 on the platform 102 and that the identification tag 108 of the item 104 has been successfully scanned, the inventory control marker deactivation apparatus 112 is actuated to deactivate the inventory control marker 114 in or on the inventory item 104.

However, as previously mentioned, this system may also inappropriately deactivate the inventory control marker 114 of a second item 118 which is stacked above, below, within, or to the side of the first item 104. In this way, the inventory control marker 114 of the second item 118 may be either purposefully or accidentally deactivated without scanning the identification tag 108 of the second item 118 and checking-out that second item 118 to the patron. This would allow a patron to remove the item from the library without having checked-out the item and the library would be unaware of the loss of the item because it would still be registered in the library's database as being present in the library. This highlights the need for another aspect of the present invention.

To prevent the deactivation and removal of a second item 118 which has not been scanned by the item identification scanner 106, an optical detector 120 is provided to determine the presence of multiple items 104, 118 on the platform 102.

The optical detector 120 receives light redirected toward the optical detector 120 from the inventory items 104, 118. The optical detector 120 uses the redirected light to generate a signal that can be evaluated to determine whether two or more items have been placed on the platform 102. The optical detector 120 may be positioned on the same side of the inventory control device 100 as the item identification scanner 106, as illustrated in FIG. 2, or on the opposite side of the device 100 from the scanner 106. In other embodiments, optical detectors 120 may be provided at multiple locations on the device 100 to offer multiple perspectives.

Figure 3:
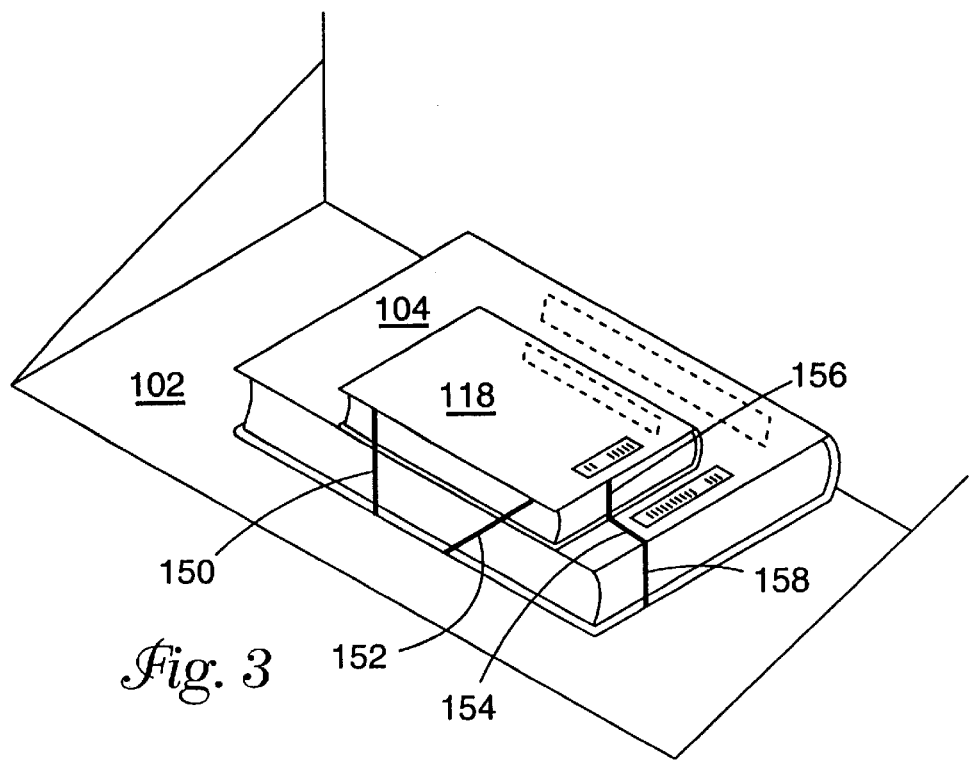
FIG. 3 is a perspective view of various profiles that can be used with the optical detector of the inventory control device of FIG. 2.

Using the redirected light, the optical detector 120 determines a profile of the inventory items 104, 118 which are placed on the platform 102 of the inventory control device 100. The term "profile" describes the intersection of a plane of light with the edges of the inventory items 104, 118. One example of a profile is a line 150 made along the edges of the inventory items 104, 118 in a plane which is approximately perpendicular to the platform 102, as illustrated in FIG. 3. However, the profile may be made along other lines 152 at the edges of the inventory items 104, 118 which are defined by planes that are not perpendicular to the platform 102. In many cases, the profile is a line 154 that has offset portions 156, 158 corresponding to an offset arrangement of the inventory items 104, 118.

An optional light source 124 may be used to direct light toward the inventory items 104, 118. A portion of this light can then be redirected by reflection or diffuse reflection from the inventory items 104, 118 toward the detector 120. This typically increases the sensitivity of the optical detector 120 because of the increased illumination. However, in some embodiments, ambient light, rather than a light source 124, is sufficient. Light that is redirected by the items 104, 118 is typically reflected or otherwise scattered by the items 104, 118 toward the optical detector 120.

The light source 124 may provide visible and/or infrared radiation depending, at least in part, upon the type of detector 120 that is used. The light source may be polychromatic (having a broad band of wavelengths) or monochromatic (having a single wavelength or a relatively narrow band of wavelengths). Examples of polychromatic light sources include incandescent and fluorescent lamps and/or light bulbs. Examples of monochromatic light sources include lasers, light-emitting diodes (LEDs), and polychromatic light sources that have been filtered to provide light having a narrow bandwidth. The light emitter 124 may be pulsed to reduce the amount of power needed to operate the inventory control device, to allow the use of a lower class of laser, and/or to increase the covertness of the device.

Typically, the optical detector 120 and the light source 124 are provided in a housing 126 of the inventory control device 100. The wall of the housing between the optical detector 120 (and the optional light source 124) and the inventory items 104, 118 is usually transparent to the type of light which is detected by the optical detector 120 and/or emitted by the light source 124. For example, if visible light is detected by the optical detector 120 then the wall may be made of material, such as clear or translucent glass or plastic, which is transparent to visible light of at least one desired wavelength or set of wavelengths. If the optical detector 120 is, for example, sensitive to infrared light then the wall is typically made of a material which is relatively transparent to infrared radiation, but may not be transparent to visible light. One such material is smoked glass, which may allow the inventory control device 100 to act covertly.

Figure 4:
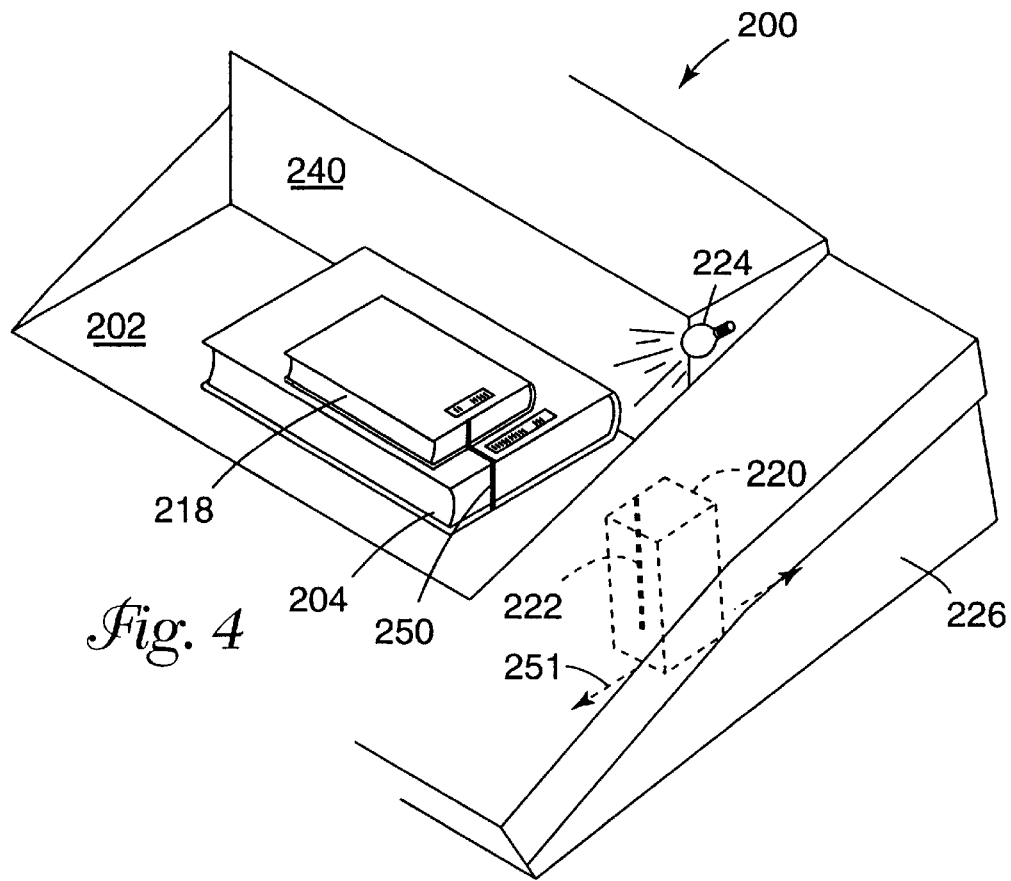
FIG. 4 is a perspective view of one embodiment of an optical detector, according to the invention, for use in the inventory control device of FIG. 2.

The optical detector 120 may take a variety of forms. For example, an optical detector 220 may be formed from a one dimensional (1-D) array of light sensitive semiconductor detector elements 222, including, for example, infrared receivers, photodiodes, or elements of a charge-coupled device (CCD), as illustrated in FIG. 4. The individual detector elements 222 receive light (ambient light and/or light from an optional light source 224) redirected from the inventory items 204, 218 toward the optical detector 220 and convert the optical signal into an electrical signal which can then be sent to a processor (not shown) for evaluation. In this embodiment, the individual detector elements 222 receive light from corresponding points along a profile 250 of the inventory items 204, 218.

In a further embodiment, the optical detector 220, as illustrated generally in FIG. 4, is capable of sliding along an axis which is typically parallel to the platform 202 (i.e., in a direction 251). The optical detector 220 receives reflected light at two or more positions along that axis, thus obtaining two or more independent profiles of the inventory items 204, 218. This may be useful for detecting inventory items which are offset from one another or have different widths.

Alternatively, an inventory control deactivation apparatus (not shown) may be coupled to the optical detector 220 so that both move back and forth (typically along the back wall 240 instead of the side wall as illustrated in FIG. 4). The inventory control deactivation apparatus deactivates inventory control markers on an inventory item unless the inventory control device 200 determines that there are multiple items 204, 218 on the platform 202.

Figure 5:
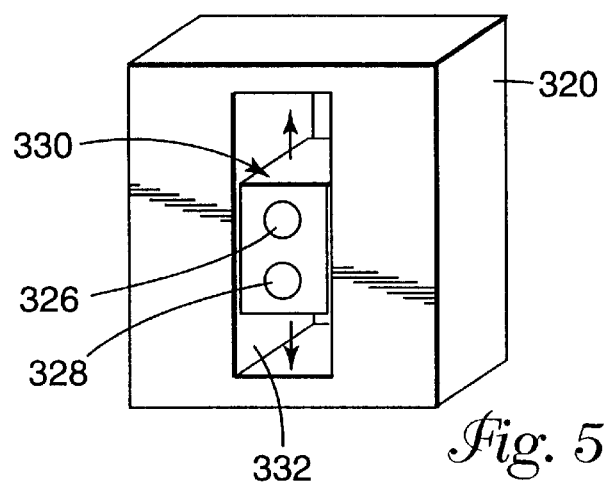
FIG. 5 is a perspective view of another embodiment of an optical detector, according to the invention, for use in the inventory control device of FIG. 2.

Another embodiment of an optical detector 320 is depicted in FIG. 5. In this embodiment, the optical detector 320 includes at least one light emitter 326 and at least one light receiver 328. The light emitter 326 and light receiver 328 are mounted on a slideable block 330 that moves within a track 332. Typically, the slidable block 330 is coupled to a motor (not shown) or other device for moving the block 330 within the track 332. In operation, light is emitted by the light emitter 326 towards the inventory items (not shown). This light is then redirected from those items and received by the light receiver 328. This light is then converted by the light receiver 328 into an electrical signal that is sent to a processor (not shown), as described above. The signal is obtained at various positions of the receiver along the track 332. Typically, the movable block 330 travels along the track 332 at a relatively slow rate compared to the time it takes light to be emitted from the light emitter 326 and received by the light receiver 328.

Alternatively, the light emitter 326 and/or light receiver 328 do not move; rather one or more moving or tilting mirrors (not shown) move. The light from the light emitter 326 may be directed at a mirror and then reflected toward different positions along the profile of the inventory items. Light redirected by the inventory item(s) from a particular position along the profile may be reflected by a mirror to the light receiver 328. One or both of these mirrors may be used to scan the profile, or the same mirror may be used for both emitter and receiver. Signals obtained from the optical detector 320 have a correspondence to signals obtained by the optical detector 220 of FIG. 4. The signal from the optical detector 320 plotted as a function of time through one pass along the track corresponds to the signal from the optical detector 220 plotted as a function of position.

Typically, the electrical signals generated by optical detectors such as detectors 220, 320 vary in amplitude at positions corresponding to the interface between two or more inventory items or between an inventory item and the platform or empty space. Signal deviations, such as these amplitude variations, which exceed a threshold value are monitored to determine whether multiple inventory items are on the platform. A variety of signal-processing techniques may be used to enhance these deviations. For example, filtering techniques may be used to remove random noise, and a stored background signal may be subtracted to remove at least some of the systemic noise. In addition, to highlight the deviations, the signal may be enhanced, by, for example, differentiation or other edge detection methods. Such techniques are generally known in the art. Deviations in signal characteristics other than amplitude may also be used to carry the information in the signal.

Once the signal has been processed, the number of deviations in a signal characteristic of interest (e.g., amplitude) which exceeds a threshold value may be counted. The particular threshold value depends on a variety of factors, such as the type of optical detector 120 and light source 124 that are used, as well as the optical properties of the inventory control device 100. In some embodiments, it may be required that the signal deviation extend over a number of consecutive data points or that the average value of a number of consecutive data points exceed the threshold value to eliminate spurious signals. Typically, the presence of two deviations that exceed the threshold value indicates that a single inventory item is present on the platform. More than two deviations which exceed the threshold value may indicate the presence of more than one item. However, signal deviations may be ignored if, for example, they are too close together; deviations, representing an item, that are closer together than the deviations representing a predetermined minimum thickness can be ignored.

When multiple items are indicated, the inventory control device 100 may suspend the check-out of the scanned item 104 and may instruct the patron to correct the situation by removing extra items 118, placing the single item 104 in a proper position (e.g., next to the back wall), or consulting with library personnel to correct the problem. The inventory control marker deactivation apparatus 112 is activated only when the inventory control device 100 is reasonably certain that only one item is present on the platform. The device may be programmed to provide a desirable degree of certainty, recognizing that an unnecessarily high level of false positives may be particularly unwelcome.

Figure 6:
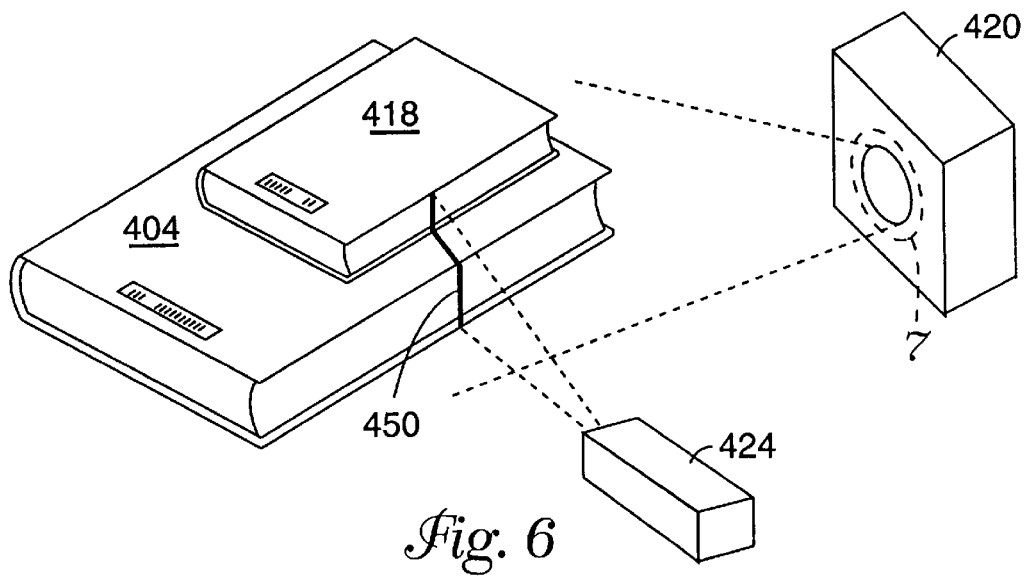
FIG. 6 is a perspective view of a third embodiment of an optical detector, according to the invention, for use in the inventory control device of FIG. 2.

Another embodiment of an optical detector 420 is illustrated in FIG. 6. This optical detector 420 typically includes a two dimensional array of individual light sensitive semiconductor detector elements (not shown), such as infrared receivers, photodiodes or elements in a CCD or CMOS array. This optical detector 420 is used in conjunction with a light source 424 that typically produces a narrow beam of light. This light source may produce a fan shaped region of light or the light source may be a point source which is movable along one or more axes to illuminate the inventory items 404, 418 along a profile 450. Typically, the optical detector 420 and the light source 424 are positioned so that light from the light source 424 that illuminates the inventory items 404, 418 is at least partially redirected toward the optical detector 420.

Figure 7:
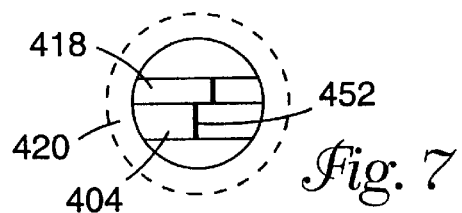
FIG. 7 is a graph of a signal received by the optical detector of FIG. 6.

FIG. 7 illustrates a typical profile 452 as it appears to the optical detector 420 for two inventory items 404, 418, which are offset from each other. The portions of the signal reflected from the items 404, 418 are offset due to a difference in the distance and the angle from the light source 424 arising from the difference in the positions of the two items 404, 418. Thus, multiple items on a platform can be detected by examining signals at the detector which are offset by more than a threshold value. Even if the two inventory items 404, 418 are not offset, there may be a signal corresponding to the space between the two items. This signal may be further processed or enhanced by methods described herein. Thus, a detection algorithm may search for any deviations from the base signal that exceed a threshold value. The threshold values are typically determined by the particular optical detector 420 and light source 424 that are used. Typically, the threshold values are at least two times the peak noise value to help eliminate spurious signals. Another method for reducing false signals due to noise is to require that the signal maintain the threshold value for a number of data points (e.g., the signal exceed the threshold value for three data points). The particular number of data points that are chosen depends on several factors, including the rate at which data points are collected and the temporal characteristics of the sources of noise.

The two-dimensional optical detector 420 may be used, in at least some embodiments, to determine the positions in three dimensional space of the items 404, 418 using triangulation methods. One method of triangulation uses the known positions of the light source 424 and the optical center of the lens of the detector 420, as well as the projection angle of the light from the light source 424 relative to a baseline and the angle at which the redirected light redirected intercepts the optical detector 420. This latter angle can be resolved into two orthogonal components relative to the optical center of the lens of the detector 420. These parameters provide sufficient information to determine the position of the items in three dimensional space. The spatial resolution of the triangulated positions is limited by the pixel pitch of the optical detector. The information regarding position of the items may be used to determine whether multiple items are on the platform.

Figure 8:
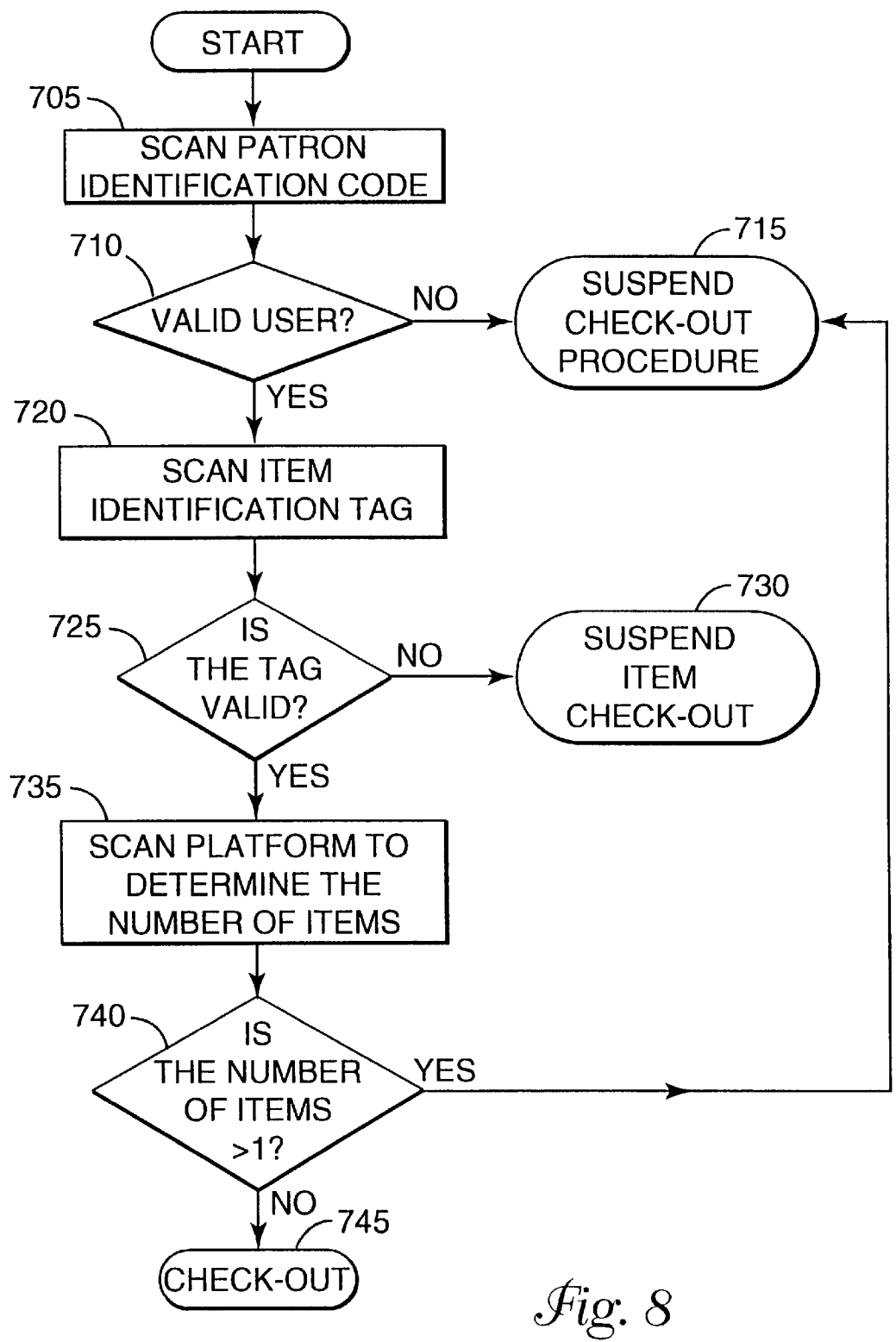
FIG. 8 is a flowchart of an exemplary procedure, according to the invention, for using the inventory control device of FIG. 1.

One example of the general operation of the inventory control device 100 of FIG. 1 is illustrated in a flow chart depicted in FIG. 8. Other methods of operation of the inventory control device may also be used. In this example, the inventory control device 100 begins a check-out procedure by reading a patron identification code from, for example, a library card (step 705). The patron identification code may be read by the item identification scanner 106 or another scanner. A database is searched to determine if the patron identification code indicates that the patron is authorized to check out library materials (step 710). If the patron is not authorized (e.g., the patron has too many overdue books, the patron owes fines, or the code is inactive), then the check-out procedure is suspended (step 715). In some embodiments, the inventory control device 100 may direct the patron to library personnel to rectify the problem. In other embodiments, the inventory control device may terminate the procedure.

Next, the item identification tag 108 is read by the item identification scanner 106 (step 720). A database is then searched to determine the validity of the item identification tag 108 (step 725). If the tag is not read on the item, the tag is invalid, or the tag is not allowed for any reason, then the check-out procedure for that item is suspended (step 730). Again, the inventory control device 100 may, for example, direct the patron to library personnel and/or terminate the procedure for that item.

If the tag is valid, the optical detector 120 receives reflected light from the item or items on the platform 102 (step 735). The signal from the optical detector 120 is then processed to determine if there is more than one item on the platform 102 (step 740). If only one item is detected then the item is checked out to the patron (step 745). Otherwise, the check-out procedure is suspended (step 715). In some embodiments, the inventory control device 100 may direct the patron to try again, to remove additional items, to reposition the item on the platform, and/or to seek aid from library personnel. In other embodiments, the inventory control device 100 may terminate the check-out procedure.

Variations of this procedure may also be used. One example of a variation is to scan the platform for multiple items (steps 735, 740, and 715) prior to reading the item identification tag (steps 720, 725, and 730). Other variations of the procedure that add, delete, or rearrange the steps may also be used.

A variety of procedures may be used to evaluate the signal from the optical detector 120 to determine the number of inventory items on the platform 102. An exemplary procedure is described and depicted in flowchart form in FIGS. 9A and 9B, in which 9B follows sequentially after 9A. The procedure begins by asking if the inventory control device 100 is ready to receive a signal (step 810). In some instances, the device 100 may not be ready if, for example, the optical detector 120 is not warmed up or the device 100 waits until a valid user has been detected by reading a valid user identification number from a library card. If the device 100 is not ready, the procedure restarts, optionally after a period of time.

If the device 100 is ready, then the optical detector 120 receives light and generates electrical signals corresponding to the received light (step 815). An optional inquiry is made as to whether the acquired signal is to be used as a background signal (step 820). If the acquired signal will be used as a background signal, then this background signal is stored in memory (step 822) and the program resumes waiting (step 810). It may be desirable to use a background signal to remove systemic irregularities including, for example, irregularities due to the difference in sensitivities of the individual detector elements in the optical detector 120 or irregularities in the wall, lenses, or other optical devices through which light passes as it is directed to the items on the platform and redirected toward the detector 120. A background signal may be obtained periodically or it may be obtained only under certain conditions, such as when the device 100 is started or when a user instructs the device 100 to do so.

If the acquired signal is not a background signal then the optional, previously stored background signal may be removed from the acquired signal (step 825). Next, the acquired signal may be filtered to remove excess noise (step 830). Such filtering may be accomplished by well-known techniques including, for example, time averaging, linear filtering, median filtering, averaging nearby points, or adaptive curve-fitting techniques such as linear least squares methods.

Optionally, the deviations in the signal may then be enhanced using various techniques, including, for example, differentiation of the signal, a high pass filter, or other edge detection techniques (step 835). The deviations in the signal arise from the interfaces between different inventory items or between an inventory item and the platform or space. A second filter, typically a low pass filter, may be used to reduce or eliminate small variations in the enhanced signal below a threshold level (step 840).

The signal (the variations of which are enhanced if optional step 835 is performed) is then observed to determine the number of deviations in amplitude (or some other signal characteristic) that are greater then a threshold value, $\delta$, or less than $-\delta$ (step 845). The threshold value, $\delta$, may dynamically adapt to the expected noise in the system. Typically, however, filtering as in step 840 may be used to reduce or remove small amplitude noise. In some embodiments, the processor evaluates a number of different types of variations, including for example, steps or peaks, which have heights that exceed the threshold value.

Figure 9A:
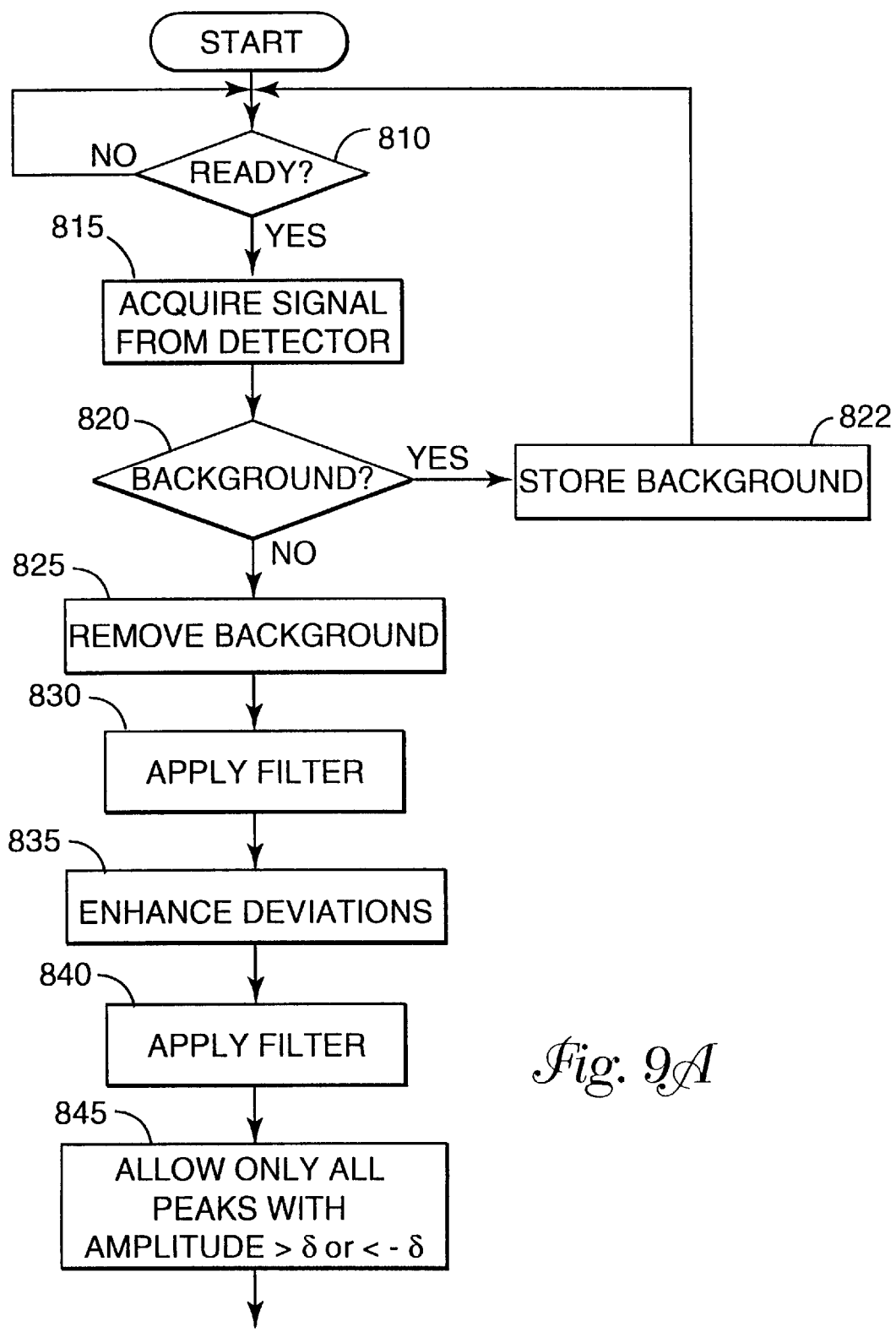
FIGS. 9A and 9B are consecutive flowcharts of an exemplary procedure, according to the invention, for evaluating the signals obtained from the optical detector of the inventory control device of FIG. 1.
Figure 9B:
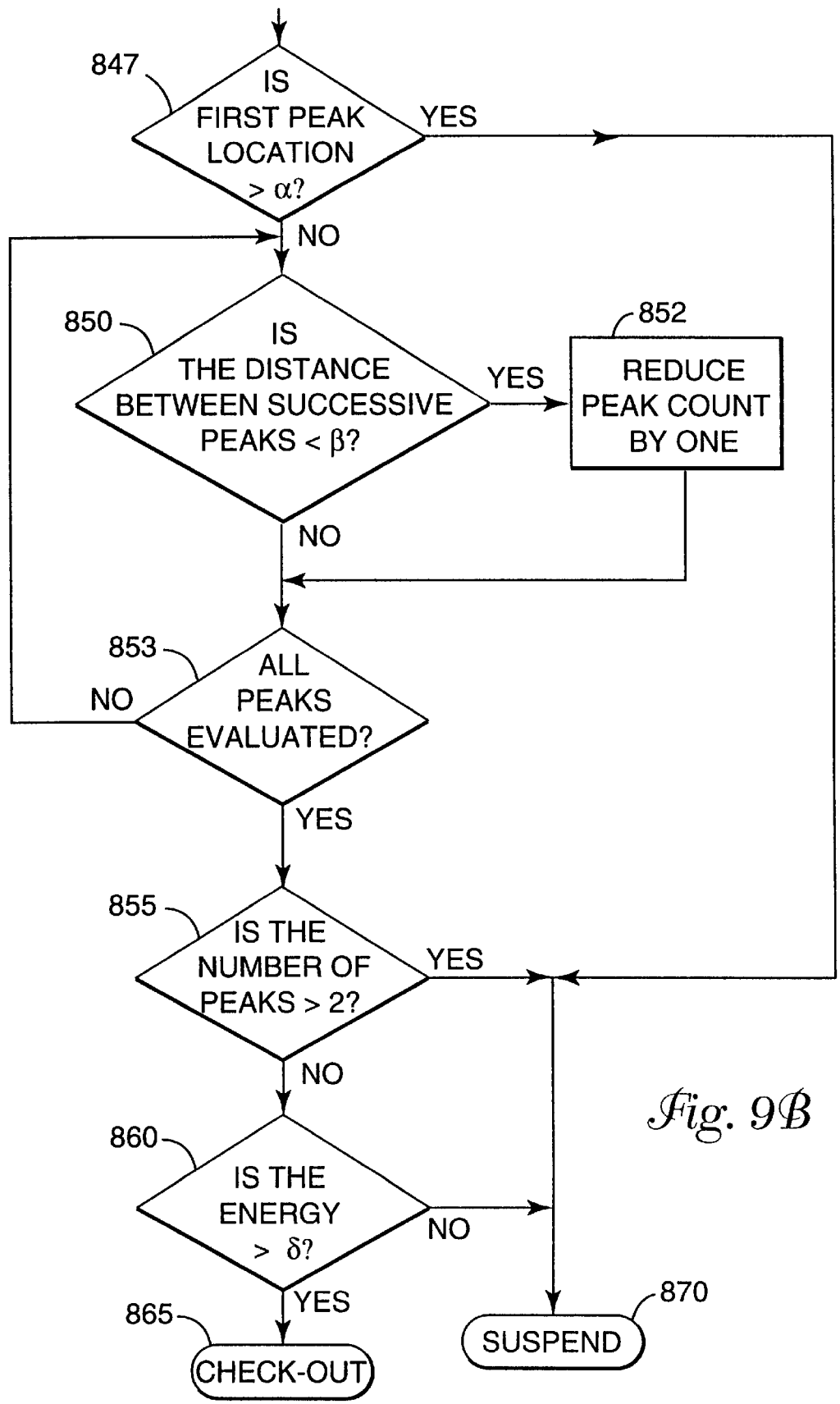

In the next step 847, shown in FIG. 9B, an inquiry is made as to whether the first variation (e.g., peak or step) allowed in step 845, is, for instance, at a location near the platform but greater than a second threshold value, $\alpha$, representing a minimum acceptable distance above the platform. If this is true than it is likely that a detected inventory item is resting on or covering an undetected inventory item, for example, a book resting on top of a CD case. In this case, the check-out procedure of the inventory item is suspended (step 870).

If the location of the first peak is not greater than the second threshold value, $\alpha$ (step 847), then a next step 850 determines whether the distance between two consecutive variations that exceed a threshold value, $\delta$, is less than a third threshold value, $\beta$. If the answer to the latter inquiry is yes, then the number of variations that exceed the first threshold level, $\delta$, is reduced by one (step 852). This indicates a condition in which the two variations are separated by a distance that is less than an acceptable minimum item thickness (e.g., the signal would indicate an inventory item, such as a book, which is too thin). This procedure is repeated for all peaks that exceed a threshold, $\delta$ (step 853).

An inquiry is then made as to whether the number of variations which exceed the first threshold level, $\delta$, that remain is greater than two (step 855). If the answer to this inquiry is yes, then this is an indication that it is likely that two or more items are on the platform and therefore the check-out procedure is suspended (step 870).

An inquiry is then made whether the total energy received by the detector exceeds a threshold amount, $\gamma$, (step 860). If the energy does not exceed the threshold amount, then this indicates that the detector may be covered by, for example, a patron's hand and therefore may be unable to detect whether multiple items are placed on the platform. In this case, the check-out procedure is also suspended (step 870).

If all of the inquiries have been answered correctly, then the check-out request is allowed (step 865). When the check-out request is allowed, the patron database and/or the inventory item database are updated to indicate that the item has been checked-out and the inventory control marker deactivation apparatus is actuated to deactivate the inventory control marker on the inventory item. If the check-out request is suspended, the request may be terminated and/or the patron may be directed to try again, to reposition the item, to remove extra items, or to seek assistance from library personnel.

It will be understood that many of the steps in the exemplary procedure of FIGS. 9A and 9B may be performed in a different order. For example, many of the inquiries regarding the signal may be performed in any order. In addition, any of the above steps may be added, deleted, or rearranged in this procedure, or other steps may be added.

Figure 10A:
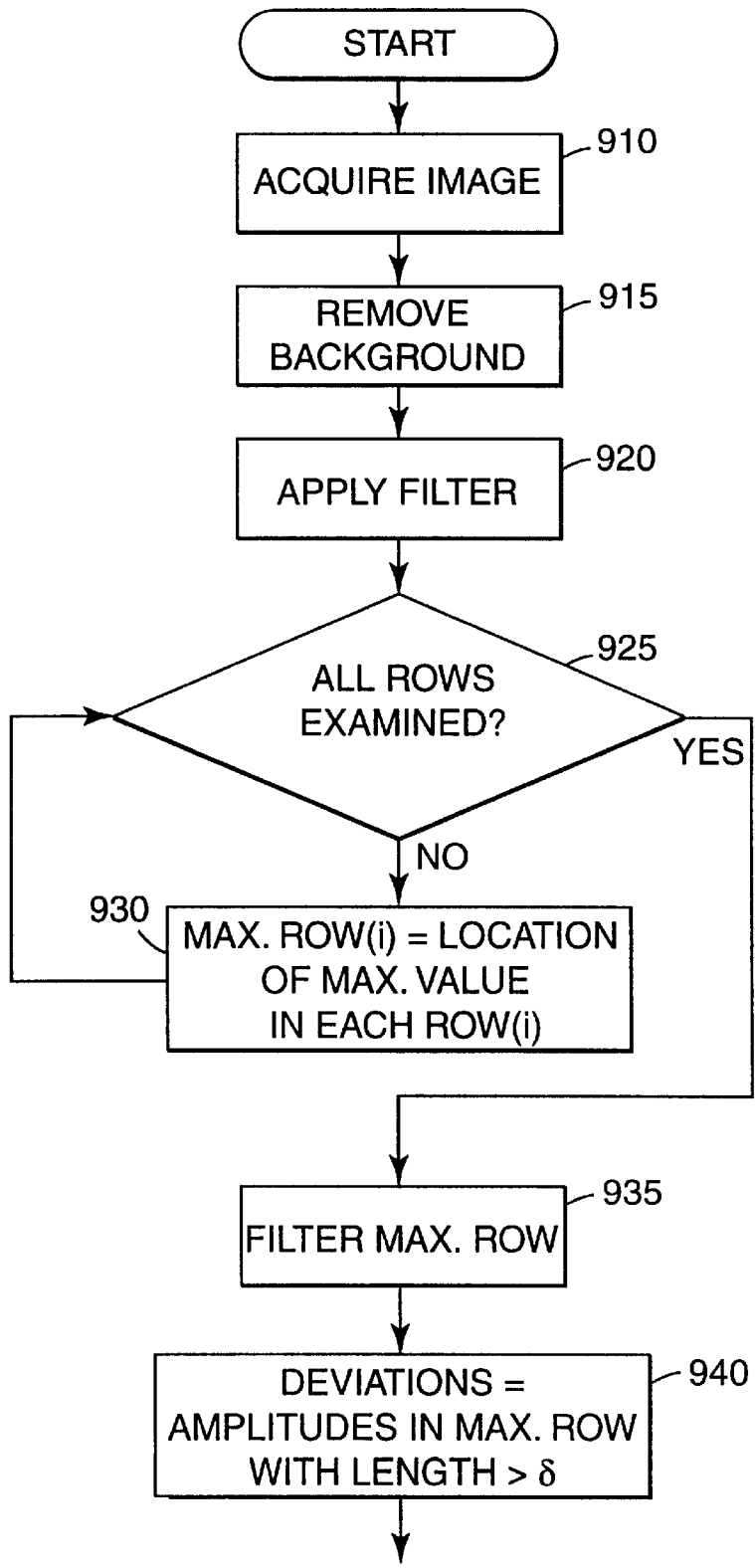
FIGS. 10A and 10B are consecutive flowcharts of an exemplary procedure, according to the invention, for evaluating the signals obtained from the optical detector of the inventory control device of FIG. 1 having the optical detector of FIG. 6.
Figure 10B:
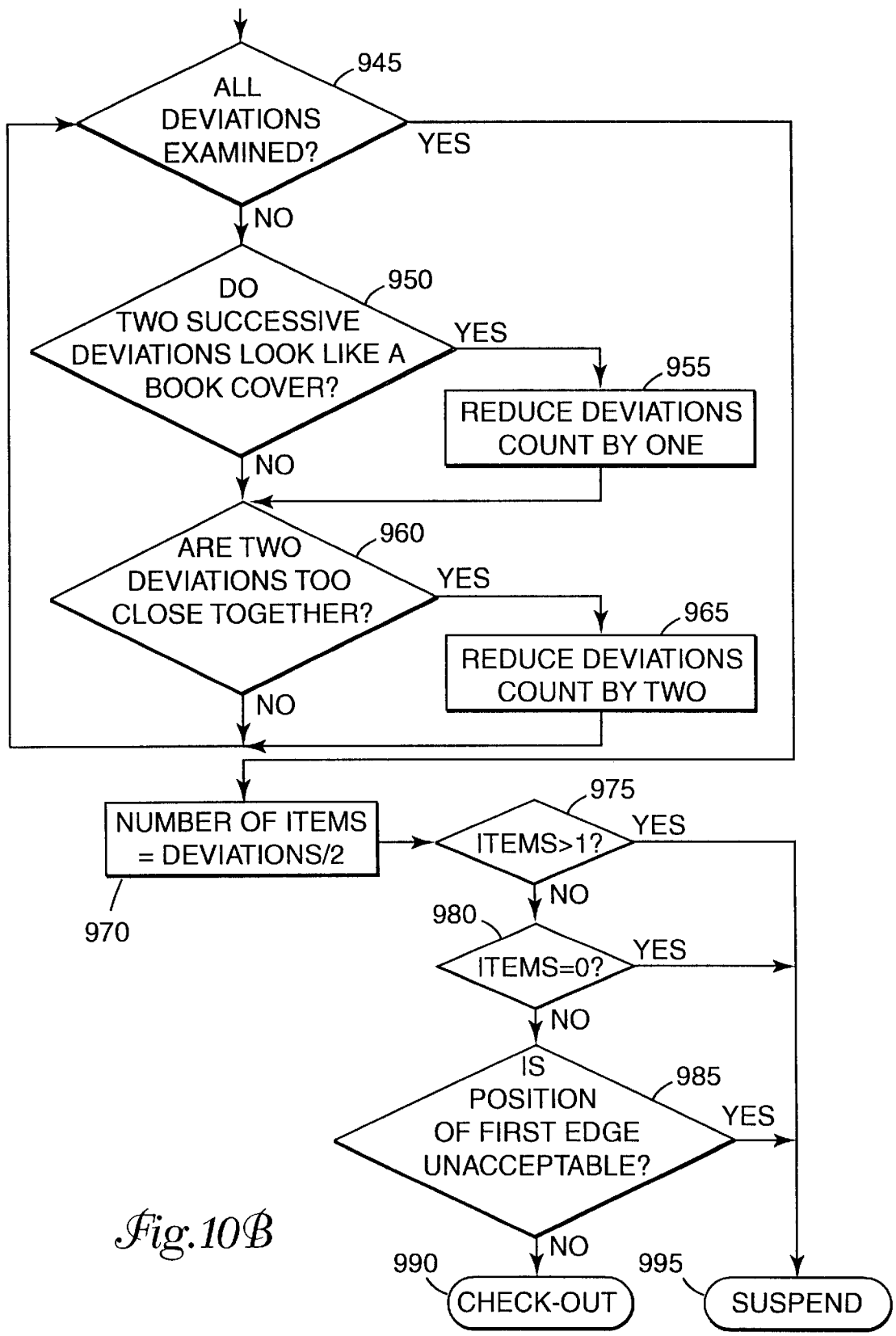

An exemplary procedure using the two-dimensional optical detector 420 is provided in flow chart form in FIGS. 10A and 10B, in which 10B follows sequentially after 10A. First, an image is acquired (step 910). An optional background signal may then be removed from the image (step 915). The background signal may be obtained as described above, including, for example, recording a background signal when the inventory control device is turned on, or when directed by the user. The image is then filtered using a low pass filter to remove noise (step 920).

The remainder of the procedure relies on the two-dimensional character of the optical detector and, in particular, on the individual detector elements being provided in rows and columns. For each row the location of the maximum value is determined (steps 925 and 930). The resultant signal may be filtered to remove noise (step 935) using techniques well known in the art. The signal is then evaluated to determine the number of deviations (e.g., peaks or edges) which have a length or height greater than a threshold value, δ (step 940). Alternatively, the signal may be enhanced by various techniques, including differentiation, high pass filtering, or other edge-enhancing techniques before determining the number of deviations which exceed a threshold level.

Several inquiries are then made to determine whether deviations should be considered to represent an item. A first inquiry is whether an edge appears to come from a book cover (step 950). This may be done by looking at a sequence of a deviation with a long length followed closely by a deviation of short length, or vice-versa. If yes, then the number of deviations is decremented by one (step 955). If no, then a second inquiry determines whether two deviations are located too close together (step 960). Deviations less than a predetermined threshold value are ignored. If yes, then the number of deviations is decremented by two (step 965). The inquiries above are then repeated for the remaining deviations (step 945).

The number of deviations is then divided by two to represent the two edges of each inventory item (step 970). Several inquiries are made to determine if checkout should be allowed. A first inquiry is whether the number of items is greater than one (step 975). If yes, then there is probably more than one item on the platform and so the check-out procedure is suspended (step 995). If no, then a second inquiry is made to determine whether the number of items is zero (step 980). If yes, then it is likely that either there are no items on the platform, or the optical detector 420 is being blocked, or the light source 424 is providing insufficient illumination, and so the check-out procedure is suspended (step 995). If the number of items is not zero, then a third inquiry is made to determine if the detected item may be resting on or covering another item (step 985). If yes, then the detected item may be resting on and/or covering another item, and, thus, the checkout procedure is suspended (step 995). Otherwise the processor indicates that the item may be checked out (step 990). The method of determining if an object is properly resting on the platform requires a calibration be performed to determine the acceptable location of objects resting properly on the platform. This is done by placing an object at a location close to the camera and noting the part of the received image corresponding to the surface of the platform. The object is moved and the part of the image corresponding to the surface of the platform is again noted. From these two locations, a linear function is extrapolated which describes the starting location of all normal conditions. An abnormal condition, i.e. an item not resting properly on the platform, can be detected by comparing the part of the image corresponding to the apparent location of the surface of the platform with an acceptable value.

When the check-out request is allowed, the patron database and/or the inventory item database are updated to indicate that the item has been checked out and the inventory control marker deactivation apparatus is actuated to deactivate the inventory control marker on the inventory item. If the check-out request is suspended, the request may be terminated and/or the patron may be directed to try again, to reposition the item, to remove extra items, or to seek assistance from library personnel.

It will be understood that many of the steps in the exemplary procedure of FIGS. 10A and 10B may be performed in a different order. For example, many of the inquiries regarding the signal may be performed in any order. In addition, other steps may be added, deleted, or rearranged in this procedure.

EXAMPLE 1

A device according to FIG. 4 was constructed. This device only contained an optical detector and not an item identification scanner or inventory control marker deactivation apparatus, because only the optical detection procedure was tested. The device included an Opticon Model 3150 CCD Line Scanner (Orangeburg, N.Y.). Visible red light from LEDs integral to the scanner was used as a source of illumination. The electrical signal from the CCD scanner was directed to a National Instruments Lab-PC+ A/D card (Austin, Tex.). Labview software from National Instruments was written that evaluated and displayed the signal from the CCD scanner, filtered and enhanced the signal, displayed the resulting processed signal, and determined if more than one item was present.

Figure 11A:
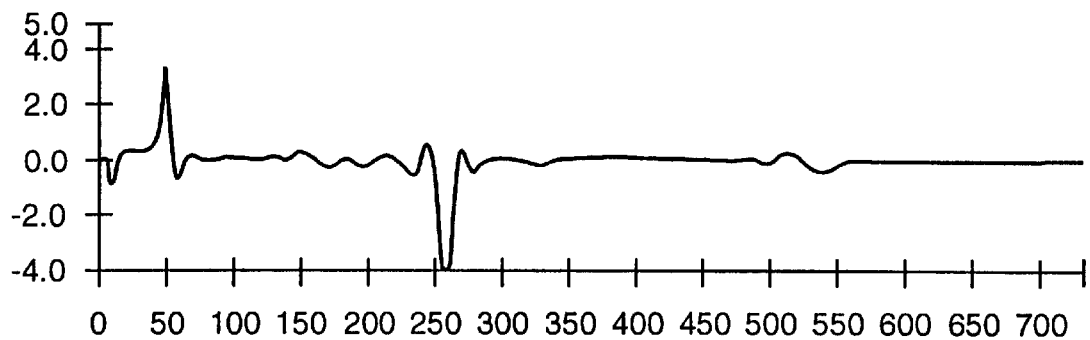
FIGS. 11A–11G are graphical representations of processed signals originally received from the device of FIG. 4.
Figure 11B:
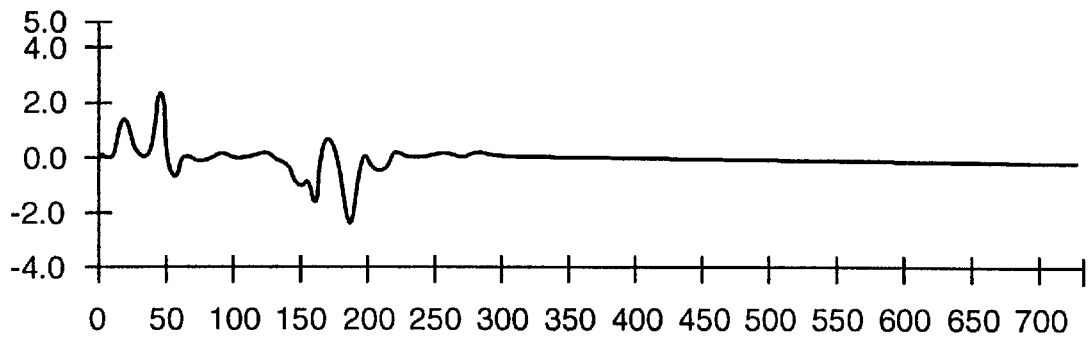

FIGS. 11A through 11G illustrate processed signals for various situations. FIG. 11A shows the signal generated for a single book. This processed signal had two peaks and the inventory control device allowed check-out. FIG. 11B shows a signal generated for a thin book with a shiny cover. Again, only two peaks were found and check out was allowed.

Figure 11C:
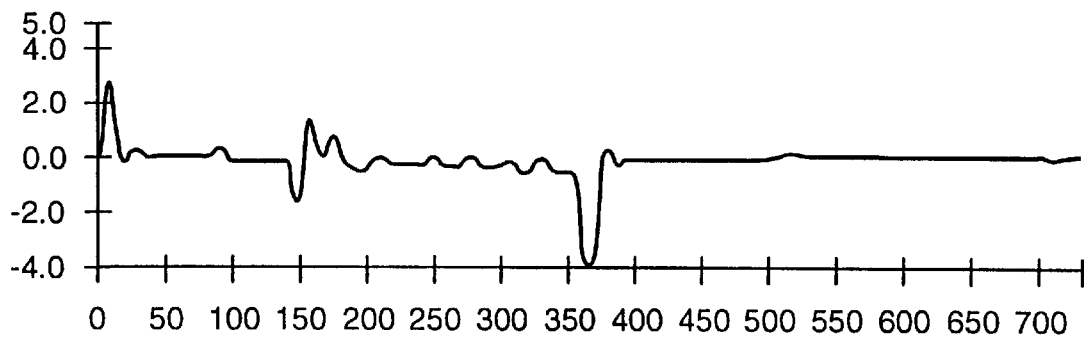
Figure 11D:
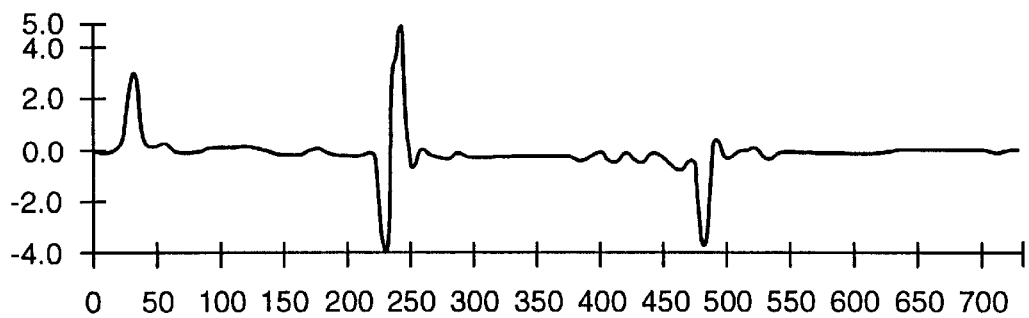

FIG. 11C shows a signal generated for two offset soft-bound books. Three peaks were found and, therefore, the inventory control device denied check out of the books. FIG. 11D shows a signal generated for a magazine inside of a book. In this case, four peaks were found and check out was denied.

Figure 11E:
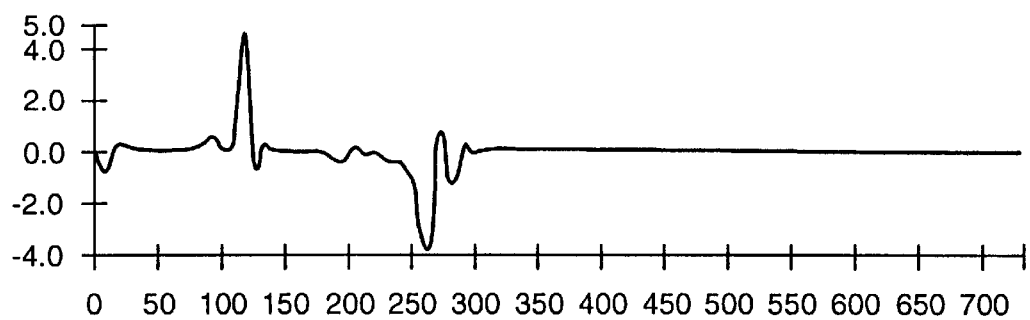
Figure 11F:
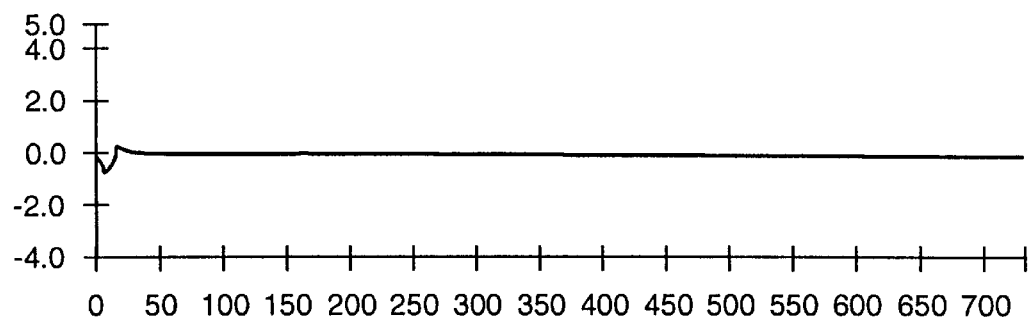

FIG. 11E shows a signal generated for a book sitting on top of a CD case. Only two peaks were found, but the first signal was displaced from the origin by more than a threshold amount, and check out was denied (see, for example, step 847 of FIG. 9B). FIG. 11F shows a signal resulting when the detector has been blocked. The amount of energy detected was below a threshold amount, and checkout was denied.

Figure 11G:
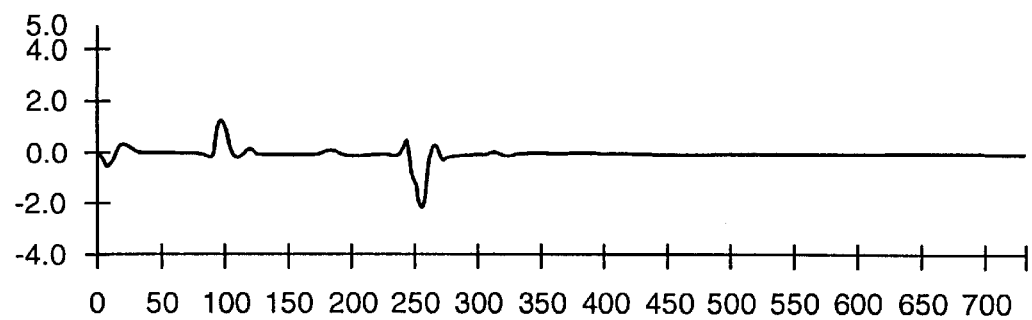

FIG. 11G shows a signal generated for a single book that was placed far away from the optical detector. Check-out was denied in this case because the inventory control device considered this signal to be from one item sitting on another item, such as a book sitting on a CD case (see FIG. 11E). The situation shown in FIG. 11G occurs when the detector is incorrectly positioned in the vertical plane, for instance when the optical center of the detector's lens is positioned at some distance above the platform. When an object is close to the detector, light rays reflected from the bottom of the object impinge at a location A on the detector. If the object is moved further away from the detector, light rays reflected from the bottom of the object now impinge at a location A' that is different from A. The relevant result is that the object will appear to the detector to move vertically in space.

A remedy for this situation is to orient the detector so that light rays reflected from the bottom of the object always impinge at the same location on the detector. One way to do this is to make sure the optical center of the detector's lens is in line with the surface of the platform. This will ensure that the reflected light rays from the bottom of the surface of the object in contact with the surface of the platform are coincident with each other independent of the distance of the object from the lens. Using this approach, moving the object closer or further from the detector will not result in apparent vertical movement of the object as depicted in FIG. 11G.

EXAMPLE 2

A device according to FIG. 6 was constructed. Two optical detectors were used: a two-dimensional CCD array, Greyscale QuickCam™ from Connectix Corp. (San Mateo, Calif.), and a two-dimensional CMOS array, Model VL5430 from VLSI Vision Limited (Edinburgh, Scotland). The light source was a 670 nm laser line generator module, Model LG-01 from Coherent, Inc. (Auburn, Calif.). Pre-processed electrical signals from the VLSI Vision CMOS optical detector were displayed directly on a conventional video monitor. Pre-processed electrical signals from the Connectrix CCD optical detector were provided to a Hewlett Packard Vectra VA6/200 computer (Palo Alto, Calif.). Software drivers provided by Connectix were used to acquire and display the images. Both detectors provided similar pre-processed images. The CCD detector was further used to provide the post-processed signals. Software was written in Matlab to process each acquired image, filter and enhance the image, display the resulting processed signal, and determine if more than one item was present. Because the preprocessed signals from the CCD and CMOS detectors were similar, it is expected that the post-processed signals of the two detectors would also be similar.

FIGS. 12A and 12B through 17A and 17B show pre- and post-processed signals for various situations. In each case the Figure with an "A" postscript shows the signal received by the 2-D array. The Figure with a "B" postscript shows the processed signal.

Figure 12A:
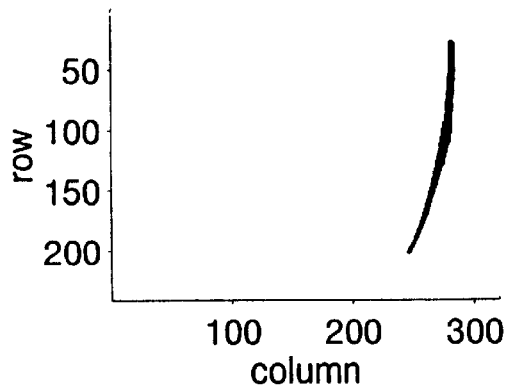
Figure 12B:
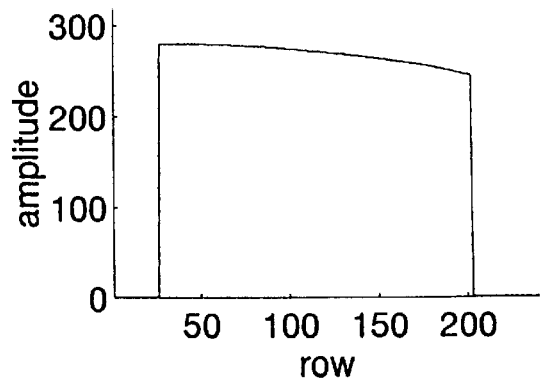

FIGS. 12A and 12B show the signals representing one thick soft cover book. The processed signal has two edges so the inventory control device allowed check out.

Figure 13A:
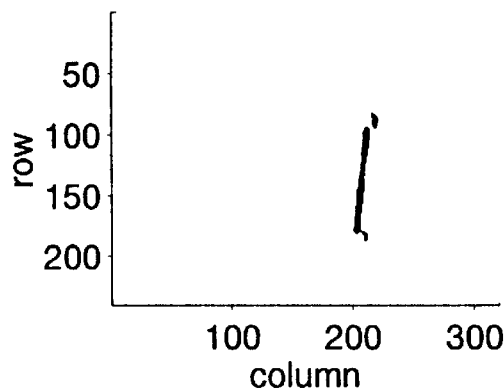
Figure 13B:
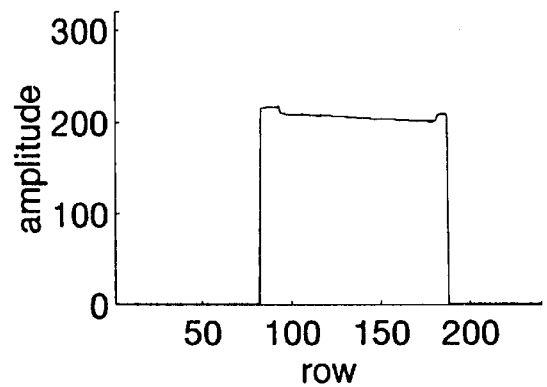

FIGS. 13A and 13B show the signals representing one hardbound book. The processed signal has four edges, but two of the inner edges were ignored because they fit the pattern for a cover of a book. The presence of only two edges resulted in check out being allowed.

Figure 14A:
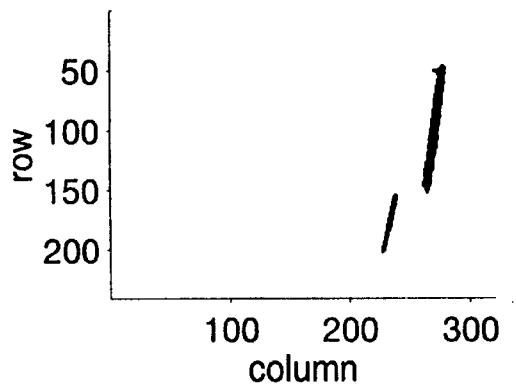
Figure 14B:
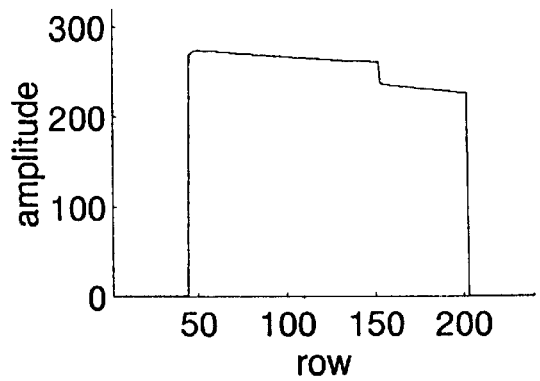

FIGS. 14A and 14B show the signals representing two softbound books stacked one atop another. The processed signal has 3 edges so the inventory device denied check out.

Figure 15A:
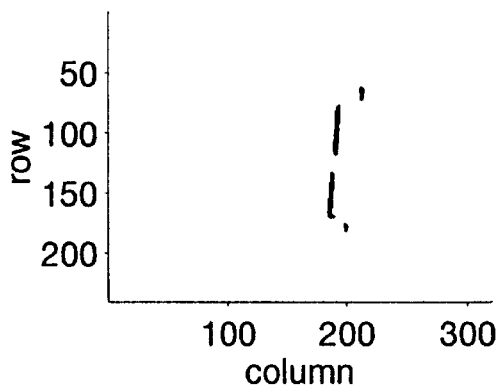
Figure 15B:
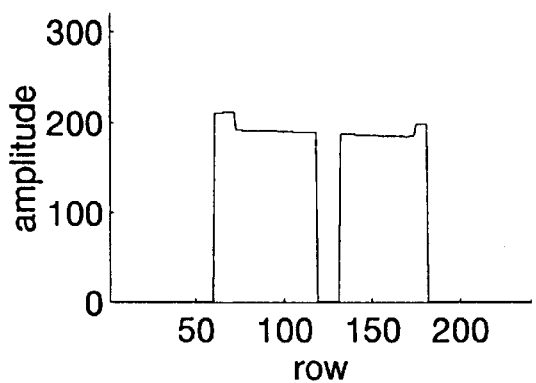

FIGS. 15A and 15B show the signals representing a magazine placed inside a hardbound book. The processed signal has six edges, but two of the inner edges were ignored because they fit the pattern for a cover of a book. The remaining presence of four edges resulted in check out being denied.

Figure 16A:
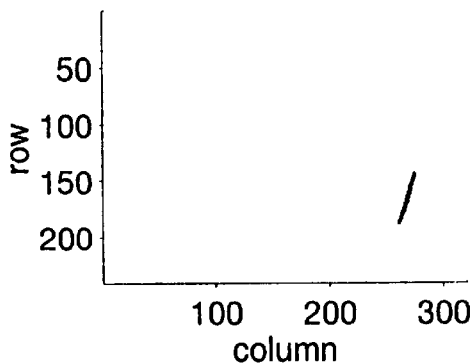
Figure 16B:
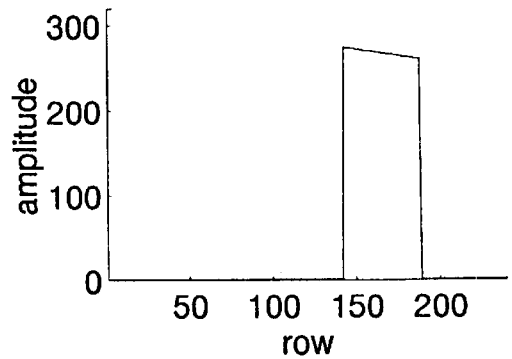

FIGS. 16A and 16B shows the signals representing a book stacked atop a CD. The processed signal has only two edges but the starting location of the bottom edge was displaced more than a threshold amount. Check out was denied.

Figure 17A:
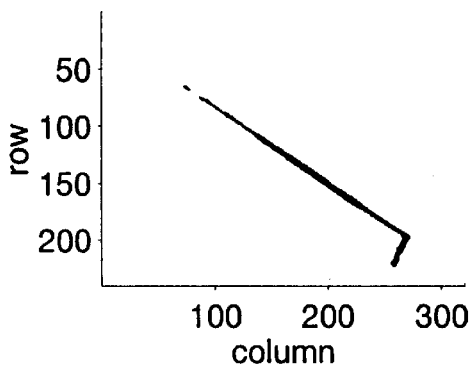
Figure 17B:
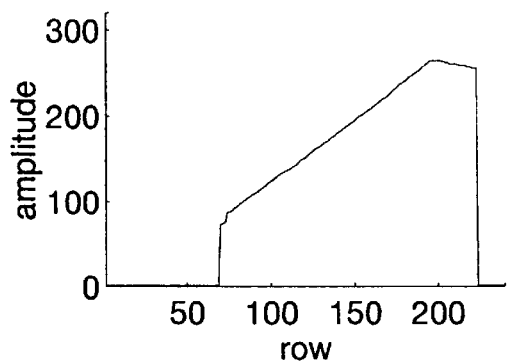

FIGS. 17A and 17B show the signals representing an item with the camera set improperly. This could have resulted in more than two edges being found, leading to check out being erroneously denied. This is remedied by ensuring that the camera is adjusted properly. It can be appreciated, that with further processing of the signal represented in FIGS. 17A and 17B, more information can be provided about the items on the platform to allow proper check-out.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification. The claims are intended to cover such modifications and devices.

We claim:

1. An apparatus for detecting the presence of multiple items on a stationary platform, the apparatus comprising:
    (a) a light source for illuminating a one-dimensional edge profile of items on the platform;
    (b) a detector spaced from the light source and positioned with respect to the platform to receive a two-dimensional image of the edge profile; and
    (c) a signal generator for providing a signal corresponding to the two-dimensional edge profile, wherein signal deviations that exceed a predetermined value are indicative of multiple items on the platform.

2. The apparatus of claim 1, further comprising a housing, wherein the platform is formed on the housing.

3. The apparatus of claim 1, wherein the light source comprises at least one laser.

4. The apparatus of claim 1, wherein the light source comprises at least one light-emitting diode.

5. The apparatus of claim 1, wherein the light source comprises at least one lamp.

6. The apparatus of claim 1, wherein the detector comprises a two-dimensional light sensitive semiconductor array, the light source and the detector being positioned so that light from the light source is redirected by items on the platform toward the detector.

7. The apparatus of claim 1, further comprising a processor operatively coupled to the detector for evaluating the signal from the detector to indicate whether multiple items are on the platform.

8. The apparatus of claim 1, wherein the detector comprises an array of optical detection elements.

9. The apparatus of claim 8, wherein the detector comprises a CCD array.

10. The apparatus of claim 9, wherein the CCD array comprises a one-dimensional linear CCD array.

11. The apparatus of claim 9, wherein the CCD array comprises a two-dimensional CCD array.

12. The apparatus of claim 8, wherein the detector comprises a CMOS array.

13. The apparatus of claim 12, wherein the CMOS array comprises a one-dimensional linear CMOS array.

14. The apparatus of claim 12, wherein the CMOS array comprises a two-dimensional CMOS array.

15. The apparatus of claim 1, wherein the detector comprises at least one infrared light receiver.

16. The apparatus of claim 15, further comprising at least one infrared light emitter for illuminating the one or more items with infrared light.

17. The apparatus of claim 16, further comprising a motor and a holder for at least one infrared light emitter and the at least one infrared light receiver, the holder operatively coupled to the motor, wherein the motor moves the holder along a path so that the infrared light emitter and infrared light receiver illuminate and obtain, respectively, the profile of items on the platform.

18. The apparatus of claim 1, further comprising an alarm which is triggered in the presence of multiple items on the platform.

19. The apparatus of claim 1, further comprising a scanner positioned to read an item identification code on an item placed on the platform.

20. The apparatus of claim 19, further comprising an inventory control deactivation device to deactivate an inventory control marker on an item placed on the platform if the scanner verifies the existence of the item identification code on the inventory item and there is only one item on the platform.

21. The method of claim 1, wherein the detector comprises a plurality of rows and columns of detector elements, each detector element generating an individual signal and wherein the signal generator combines the signals from the detector elements to create a composite signal.

22. The method of claim 21, wherein the signal generator combines the signals from the detection elements by determining a highest signal value among all of the detection elements of each row or column of detector elements and uses the highest signal value for each row or column to form the composite signal.

* * * * *